United States Patent [19]

DiStefano

[11] Patent Number: 5,264,467
[45] Date of Patent: Nov. 23, 1993

[54] HIGH PERFORMANCE SOLVENT-FREE CONTACT ADHESIVE

[75] Inventor: Frank V. DiStefano, Macungie, Pa.

[73] Assignee: Air Products and Chemicals, Inc., Allentown, Pa.

[21] Appl. No.: 764,758

[22] Filed: Sep. 24, 1991

[51] Int. Cl.$^5$ .................... C09J 131/04; C09J 133/02; C09J 5/06
[52] U.S. Cl. .................... 523/218; 524/524; 524/527; 524/556
[58] Field of Search ............... 523/218; 524/524, 527, 524/556

[56] References Cited

U.S. PATENT DOCUMENTS

| | | | |
|---|---|---|---|
| 3,316,187 | 4/1967 | Grosner et al. | 260/2.5 |
| 4,098,945 | 7/1978 | Oehmke . | |
| 4,367,745 | 1/1983 | Welage | 428/327 |
| 4,748,061 | 5/1988 | Vesley . | |

FOREIGN PATENT DOCUMENTS 0349216  1/1990  European Pat. Off. .
56-161486 12/1981 Japan .
62-50595 10/1987 Japan .

*Primary Examiner*—Paul R. Michl
*Assistant Examiner*—Andrew E. C. Merriam
*Attorney, Agent, or Firm*—Michael Leach; James C. Simmons; William F. Marsh

[57] ABSTRACT

An aqueous contact adhesive composition consisting essentially of
 a) an aqueous emulsion containing an adhesive polymer,
 b) 0-50 wt % plasticizer, based on polymer solids,
 c) 0.5-10 wt % thermoplastic hollow microspheres, based on polymer solids, and
 d) 0-4.5 wt % polyethylenimine, based on polymer solids, the adhesive composition demonstrating less than one pound per linear inch adhesion to stainless steel by PSTC-1 method.

23 Claims, No Drawings

HIGH PERFORMANCE SOLVENT-FREE CONTACT ADHESIVE

FIELD OF THE INVENTION

The present invention relates to aqueous contact adhesives and a method for bonding two substrates together using such contact adhesives.

BACKGROUND OF THE INVENTION

Contact adhesives differ from other adhesives, such as pressure sensitive adhesives, in that the adhesives are applied to both substrates to be joined and then dried. These adhesives are characterized by a bonding range or "open time", i.e. the period after the adhesive is dried during which adhesive coated substrates can be successfully joined and bonded. Contact adhesives are used to manufacture decorative laminates.

Environmental regulations require a reduction in solvent emissions in the decorative laminate industry. Solvent based neoprene contact adhesives, the industry standard, are a primary source of these emissions. Attempts have been made to reduce solvent volatiles through the use of aqueous contact adhesives or high solids solvent-based adhesives. However, in both cases some solvent is necessary in the adhesive to achieve the requisite performance, particularly tack. Those completely solvent free adhesives which have been offered are of inferior performance.

JP 62-50595 discloses an adhesive composition for interior decoration materials used in vehicles comprising 3 to 100 wt parts of hollow glass particles with a particle density of 0.05 to 0.5 g/cm$^3$ and a mean particle size of 10 to 100 microns, 100 wt parts of a macromolecular latex (solid matter), and no more than 300 wt parts of a thermoplastic resin powder.

U.S. Pat. No. 4,748,061 discloses pressure sensitive adhesive tape in which the adhesive layer can either be filled with microbubbles or have a cellular core. Example 6 shows the use of polymeric microbubbles made from a copolymer of vinylidene chloride and acrylonitrile in a syrup of coatable viscosity prepared by partially photopolymerizing a mixture of isooctyl acrylate and acrylic acid to which hexanediol diacrylate, polymeric microbubbles and carbon black are added. Example 1 uses glass microbubbles in the same syrup. EP 0 349 216 A discloses an acrylate pressure sensitive adhesive tape, several examples of which contain Expancel 551 DEK polymeric microspheres. The phase-separated, ultra violet-radiation polymerized, pressure sensitive adhesives comprise a) about 70 to 98 parts of an acrylic copolymer, and
b) 30 to about 2 parts of a hydrocarbon elastomer or blend of hydrocarbon elastomers containing at least one segment having a lower Tg than the acrylic copolymer, wherein the adhesive has at least a first phase and a second phase, the first phase consisting primarily of the elastomer, and preferably being a continuous phase.

U.S. Pat. No. 3,316,187 discloses aqueous binder compositions for bonding, sealing and caulking of masonry units (tile, cement block, cinder block, red brick, etc.). The composition comprises an ambient temperature curable liquid synthetic resin and an ambient temperature curing agent therefor; an elastomeric agent for the composition, and a cellular organic filler material known as phenolic microballoons.

SUMMARY OF THE INVENTION

The present invention provides a water-based contact adhesive composition consisting essentially of:
a) an aqueous emulsion of an adhesive polymer,
b) 0-50 wt % plasticizer, based on adhesive polymer,
c) 0.5-10 wt % thermoplastic hollow microspheres, based on adhesive polymer, and
d) 0-4.5 wt % polyethylenimine, based on adhesive polymer, the adhesive composition demonstrating less than 1 pound per linear inch (pli) adhesion to stainless steel by PSTC-1 method.

Another embodiment of the invention provides a method for laminating two substrates which comprises applying a coating of the above aqueous contact adhesive to a surface of each of the substrates, drying the coatings and joining the adhesive-coated surfaces of the substrates, preferably under application of pressure.

The invention allows the formulation of a high performance aqueous contact adhesive without the addition of organic solvent.

DETAILED DESCRIPTION OF THE INVENTION

The aqueous based contact adhesive compositions comprise an aqueous medium containing 30 to 80 wt % adhesive component, preferably having a durometer value measured on the type A scale by ASTM D 2240 greater than about 20, desirably greater than about 30. The durometer value is determined from a dry film of the adhesive component which comprises the emulsion polymer and all other additives of the contact adhesive excluding the thermoplastic microspheres. The adhesive composition of the invention is not a pressure sensitive adhesive since it demonstrates less than 1 pound per linear inch (pli) adhesion to stainless steel by PSTC-1 method.

Any of a number of adhesive polymer emulsions well known in the art and based upon, for example, vinyl acetate-ethylene, acrylic, styrene-acrylic, styrene-butadiene or neoprene polymers may be used in the adhesive component of the contact adhesive.

The preferred aqueous adhesive copolymer emulsion is a vinyl acetate-ethylene (VAE) copolymer emulsion containing 40 to 65 wt % solids. The copolymer would comprise vinyl acetate, 5 to 40 wt %, preferably 15 to 30 wt %, ethylene and 0 to 10 wt % of other copolymerizable monomers. Desirable contact adhesive compositions containing such VAE emulsions would also contain 15 to 50 wt % plasticizer. Suitable VAE emulsions are marketed by several manufacturers including Air Products and Chemicals, Inc., National Starch and Chemicals, Inc. and Reichhold Chemicals, Inc.

An especially preferred VAE copolymer emulsion is one in which the copolymer is polymerized in the presence of a stabilizing system consisting essentially of low molecular weight polyvinyl alcohol and a polyalkoxylated nonionic surfactant and the emulsion contains about 65% solids, such as Airflex ® 465 VAE emulsion from Air Products and Chemicals, Inc. U.S. Pat. No. 4,921,898 discloses a method for making such VAE copolymer emulsion.

As suitable plasticizers there may be used materials which a worker in the art may know as being a tackifier or a softening agent so long as it is the functional equivalent of a plasticizer for the purpose of this invention. Suitable plasticizers are of the usual type and well known to those in the art, namely, substantially nonvolatile solvents for the polymer and compatible therewith in the emulsion system. Examples of such plasticizers include dibutyl phthalate, ethyl butyl phthalate, butyl benzyl phthalate, aryl sulfonamides such as N-ethyl-o- and p-toluene sulfonamide, polymeric ester plasticizers, poly(alkyleneoxy) ethers of phenols such as nonylphenoxy poly(ethyleneoxy) ethanols and the like. Preferred amounts of plasticizer in the composition are 20 to 40 wt % for VAE emulsion copolymers and 0 to 20 wt % for other adhesive polymers.

Fillers of known utility such as clay, calcium carbonate, mica, feldspar and the like are suitable.

The adhesive composition most importantly contains 0.5 to 10 wt %, preferably 0.7 to 5 wt % of resilient, thermoplastic hollow microspheres having a dry density of 0.01 to 0.1 g/cm$^3$, preferably 0.02 to 0.06 g/cm$^3$. The thermoplastic hollow microspheres, also known as expandable thermoplastic beads, for example poly(vinylidene chloride-acrylonitrile), polystyrene or poly(styrene-acrylonitrile) beads, are produced commercially in a suspension polymerization process where a liquid monomer or mixture of monomers is dispersed in an aqueous medium containing one or more suspension agents, a volatile liquid hydrocarbon blowing agent and a polymerization initiator. The beads are produced as a slurry in an aqueous medium remaining after the polymerization.

In the initial stage of such a process, the monomers and the blowing agent form a droplet with a single phase. Then as the polymerization proceeds, the blowing agent forms a separate phase as small inclusions in the formed thermoplastic droplet because it is insoluble in thermoplastic droplet. Thus the obtained beads comprise thermoplastic shells containing the liquid, volatile blowing agent.

The beads may be expanded by being heated to a temperature both above the boiling point of the blowing agent and above the softening point of the thermoplastic, for example at about 70° C. for poly(vinylidene chloride-acrylonitrile) beads.

Especially preferred microspheres are polymeric microspheres, such as those described in U.S. Pat. Nos. 3,615,972; 4,075,238 and 4,287,308. The microspheres are available from Pierce & Stevens Company under the trademark "MICROLITE" in unexpanded form and "MIRALITE" in expanded form. Similar microspheres are available from Kema Nord Plastics under the trademark "EXPANCEL" and from Matsumoto Yushi Seiyaku under the trademark "MICROPEARL". In expanded form, the microspheres have a specific density of approximately 0.02-0.036 g/cm$^3$. It is possible to include the unexpanded microspheres into the contact adhesive composition and subsequently heat them to cause expansion, but it is generally preferred to mix the expanded microspheres into the adhesive composition. Polymeric microspheres having an average diameter of 10 to 200 micrometers may be blended into the adhesive composition.

An adhesive with superior water resistance and thermal resistance may be achieved by also incorporating polyethyleneimine at levels of 0.75 to 4.5 wt %, based on adhesive polymer. The preferred level of polyethylenimine is 1.5 to 3 wt %. Suitable polyethylenimines would have an average molecular weight of about 30,000 to 150,000 and those having an average molecular weight of about 70,000 are available commercially from BASF.

Desirable aqueous contact adhesive compositions based on aqueous Airflex VAE copolymer emulsion would comprise the following components in the indicated wet weight ranges based on 100 parts by weight VAE emulsion:

| Range | Wet Weight Range | Preferred |
|---|---|---|
| Airflex 465[a] | 100 | 100 |
| Benzoflex 988[b] | 10–30 | 15–25 |
| Igepal CO 887[c] | 0–4 | 1–3 |
| Polymin P[d] | 1–6 | 2–4 |
| Expancel 551[e] | 2–20 | 3–10 |

[a]Airflex 465 VAE emulsion (66% solids)
[b]Dipropyleneglycol dibenzoate plasticizer (100% solids)
[c]Nonylphenoxy poly(ethyleneoxy) ethanol, EO = 30. (70% solids)
[d]Polyethylenimine (50% solids)
[e]Poly(vinylidene chloride-acrylonitrile) microspheres (15% solids)

The dry weight ranges for the components in the above aqueous contact adhesive composition would be as follows:

| Range | Dry Weight Range | Preferred |
|---|---|---|
| A-465 | 100 | 100 |
| Benzoflex 988 | 15–45 | 23–38 |
| Igepal CO 887 | 0–4.2 | 1–3.2 |
| Polymin P | 0.75–4.5 | 1.5–3 |
| Expancel 551 | 0.5–4.5 | 0.7–2.3 |

The contact adhesive composition can be applied to any substrate surface and will firmly bond such materials as leather, wood, metals, particle board, Formica and Wilsonart brand plastic laminates, fabrics, unglazed ceramics, wallboards and carpet to themselves and to each other.

A coating of the aqueous contact adhesive is applied to a surface of each of the substrates to be joined and then dried. The dry adhesive-coated surfaces of the substrates are joined together, preferably under pressure.

In the following examples, the adhesive compositions were tested in a high pressure laminate (HPL) to particle board (PB) construction. The adhesive composition was coated on each surface at 4 g/ft$^2$ (43 g/m$^2$) dry weight and allowed to dry one hour prior to mating the surfaces with a 30 pound (6.6 kg) roller across 3 linear inches (7.62 cm). The peel test was performed across 3 linear inches (7.62 cm) of the bonded construction and a crosshead speed of 2 inches/min (5.08 cm/min).

EXAMPLE 1

The base aqueous contact adhesive composition comprised 100 parts by wt (pbw) Airflex ® 465 VAE copolymer emulsion (66% solids; Air Products and Chemicals, Inc.), 20 parts pbw Benzoflex 988 plasticizer and 2 parts Igepal CO 887 surfactant used as a plasticizer. Expancel 551 WE thermoplastic hollow microspheres (0.036 g/cm$^3$; Nobel Ind) and Scotchlite K-2 hollow glass microspheres (0.19 g/cm$^3$; 3M Co) were evaluated for peel strength in the contact adhesive at various levels.

TABLE 1

| Run | Expancel 551 WE | Scotchlite K-2 | Peel (pli) |
|---|---|---|---|
| 1 | 0 | 0 | 31 |
| 2 | 3 | — | 44 |
| 3 | 6 | — | 49 |

TABLE 1-continued

| Run | Expancel 551 WE | Scotchlite K-2 | Peel (pli) |
|---|---|---|---|
| 4 | 9 | — | 56 |
| 5 | — | 3 | 36 |
| 6 | — | 6 | 26 |
| 7 | — | 9 | 19 |

It can be seen from the data that the thermoplastic microspheres provided an unexpected improvement in peel strength compared to glass microspheres which adversely affected peel strength.

EXAMPLE 2

In this Example, Fastbond 30 adhesive (aqueous, tackified neoprene adhesive from 3M Company) was evaluated with the thermoplastic and glass microspheres.

TABLE 2

| Run | Expancel 551 WE | Scotchlite K-2 | Peel (pli) |
|---|---|---|---|
| 8 | 0 | 0 | 38 |
| 9 | 3 | — | 52 |
| 10 | 6 | — | 56 |
| 11 | 9 | — | 66 |
| 12 | — | 3 | 34 |
| 13 | — | 6 | 31 |
| 14 | — | 9 | 33 |

Again, the data shows the remarkable and surprising improvement in the peel strength of the contact adhesive when the thermoplastic microspheres are used compared to the glass microspheres.

EXAMPLE 3

In this Example, Expancel 551 WE microspheres were used at a much higher loading (20% on dry adhesive) with Fastbond 30 adhesive. Table 3 shows the peel strength improvement at various coat weights compared to Fastbond 30 without microspheres.

TABLE 3

| Run | Expancel 551 WE | Coatweight (g/ft$^3$) | Peel (pli) |
|---|---|---|---|
| 15 | 0 | 1.5 | 33 |
| 16 | 20 | 1.5 | 45 |
| 17 | 0 | 2.5 | 39 |
| 18 | 20 | 2.5 | 76 |

EXAMPLE 4

The impact of the thermoplastic microspheres on the aqueous contact adhesive composition of Example 1 was evaluated using qualitative hand peel tests common to the industry. The tests were performed at two different humidities and two different drying times to simulate actual use conditions. Both tack and bond strength were seen to increase with increasing thermoplastic microsphere level.

TABLE 4

| Expancel Loading (phe)$^a$ | 70° F., 70% RH | | | | 70° F., 58% RH | | | |
|---|---|---|---|---|---|---|---|---|
| | 30' | | 60' | | 30' | | 60' | |
| | tack | bond | tack | bond | tack | bond | tack | bond |
| 0 | F | F | F | F | F | F-G | F | F |
| 2 | F | F | F-G | G | G | VG | G | VG |
| 3 | F-G | F-G | VG | VG | VG | E | VG | VG |

TABLE 4-continued

| Expancel Loading (phe)$^a$ | 70° F., 70% RH | | | | 70° F., 58% RH | | | |
|---|---|---|---|---|---|---|---|---|
| | 30' | | 60' | | 30' | | 60' | |
| | tack | bond | tack | bond | tack | bond | tack | bond |
| 4 | G | G | VG | VG | VG | E | VG | VG |

F = Fair
G = Good
VG = Very Good
E = Excellent
$^a$parts per hundred parts emulsion

EXAMPLE 5

The impact of polyethylenimine (Polymin P; BASF Corp) level upon the water and thermal resistance of the aqueous contact adhesive of Example 1 containing 4 phe Expancel 551 WE microspheres was evaluated using bonded constructions prepared as previously described, aged one week, then soaked 24 hours in water and tested immediately. Similarly aged samples were tested in a peel mode with a 1 Kg load starting at 68° F. (20° C.) and increasing 18° F. (10° C.)/10 min. The temperature failure mode was noted.

TABLE 5

| Run | PEI Level (phe) | Peel (pli) 24h soak | Peel Failure Temp (°C.) |
|---|---|---|---|
| 19 | 0 | 0 | 83 |
| 20 | 1 | — | 112 |
| 21 | 2 | 15 | 120 |
| 22 | 2.5 | 20 | 121 |
| 23 | 3 | 22 | 135 |
| 24 | 3.5 | 22 | 124 |
| 25 | 6 | 6 | 112 |

The data shows that addition of polyethylenimine has a positive impact on water and thermal resistance. However, at higher levels, water and thermal resistance are compromised.

The addition of resilient hollow thermoplastic microspheres to a contact adhesive provides gap filling properties which, in turn, maximizes bonded area. Also, due to their resilient nature, the microspheres are compressed during the lamination process, also increasing bonded area.

It is speculated that addition of polyethylenimine to a VAE adhesive containing Expancel poly(vinylidene chloride-acrylonitrile) microspheres improves water and thermal resistance via a crosslinking mechanism. It is believed the copolymer is capable of reacting with polyamines such as polyethylenimine to form covalent bonds.

STATEMENT OF INDUSTRIAL APPLICATION

The present invention provides improved aqueous contact adhesive compositions and a method for making laminates using such contact adhesive.

I claim:

1. An aqueous contact adhesive composition consisting essentially of
   a) an aqueous emulsion containing a contact adhesive polymer which is a vinyl acetate-ethylene, acrylic or neoprene polymer,
   b) 0-50 wt % plasticizer, based on contact adhesive polymer,
   c) 0.5-10 wt % thermoplastic hollow microspheres, based on contact adhesive polymer, and
   d) 0-4.5 wt % polyethylenimine, based on contact adhesive polymer, the adhesive composition demonstrating less than one pound per linear inch adhesion to stainless steel by PSTC-1 method.

2. The composition of claim 1 in which the aqueous emulsion is a vinyl acetate-ethylene copolymer emulsion.

3. The composition of claim 2 in which the vinyl acetate-ethylene copolymer is polymerized in the presence of a stabilizing system consisting essentially of low molecular weight polyvinyl alcohol and a polyalkoxylated nonionic surfactant and the emulsion contains about 65% solids.

4. The composition of claim 1 in which the aqueous emulsion is a neoprene polymer emulsion.

5. The composition of claim 1 in which the microspheres have a dry density of 0.01 to 0.1 g/cm$^3$.

6. The composition of claim 5 in which the microspheres are poly(vinylidene chloride-acrylonitrile), polystyrene or poly(styrene-acrylonitrile) microspheres.

7. The composition of claim 1 in which the polyethylenimine has an average molecular weight of about 30,000 to 150,000.

8. The composition of claim 1 in which the polyethylenimine has an average molecular weight of about 70,000.

9. An aqueous contact adhesive composition consisting essentially of
   a) an aqueous emulsion containing a contact adhesive polymer which is a vinyl acetate-ethylene, acrylic or neoprene polymer,
   b) 0-50 wt % plasticizer, based on contact adhesive polymer,
   c) 0.5-10 wt % thermoplastic hollow microspheres, based on contact adhesive polymer, the microspheres having a dry density of 0.01 to 0.1 g/cm$^3$ and being poly(vinylidene chloride-acrylonitrile), polystyrene or poly(styrene-acrylonitrile) microspheres, and
   d) 0-4.5 wt % polyethylenimine, based on contact adhesive polymer, having an average molecular weight of about 30,000 to 150,000, the adhesive composition demonstrating less than one pound per linear inch adhesion to stainless steel by PSTC-1 method.

10. The composition of claim 9 in which the aqueous emulsion is a vinyl acetate-ethylene copolymer emulsion, the copolymer polymerized in the presence of a stabilizing system consisting essentially of low molecular weight polyvinyl alcohol and a polyalkoxylated nonionic surfactant and the emulsion contains about 65% solids.

11. The composition of claim 9 in which the contact adhesive polymer is an acrylic or neoprene polymer and the microspheres are poly(vinylidene chloride-acrylonitrile) microspheres.

12. The composition of claim 11 which contains 0-20 wt % plasticizer, 0.7-5 wt % thermoplastic hollow microspheres and 0.75-4.5 wt % polyethylenimine.

13. An aqueous contact adhesive composition consisting essentially of
   a) an aqueous contact adhesive vinyl acetate-ethylene copolymer emulsion, the vinyl acetate-ethylene copolymer polymerized in the presence of a stabilizing system consisting essentially of low molecular weight polyvinyl alcohol and a polyalkoxylated nonionic surfactant and the emulsion containing at least 65% solids,
   b) 15-50 wt % plasticizer, based on contact adhesive copolymer,
   c) 0.5-4.5 wt % thermoplastic hollow microspheres, based on contact adhesive copolymer, the microspheres having a dry density of 0.02 to 0.06 g/cm$^3$ and are poly(vinylidene chloride-acrylonitrile), polystyrene or poly(styrene-acrylonitrile) microspheres, and
   d) 0.75-4.5 wt % polyethylenimine, based on contact adhesive copolymer, having an average molecular weight of about 30,000 to 150,000, the adhesive composition demonstrating less than one pound per linear inch adhesion to stainless steel by PSTC-1 method.

14. The composition of claim 13 which contains 24-41 wt % plasticizer, 0.7-2.3 wt % thermoplastic hollow microspheres and 1.5-3 wt % polyethylenimine.

15. The composition of claim 14 in which the microspheres are poly(vinylidene chloride-acrylonitrile) microspheres.

16. The composition of claim 15 in which the plasticizer is dipropyleneglycol dibenzoate.

17. A method for laminating two substrates which comprises applying a coating of an aqueous contact adhesive composition to a surface of each of the substrates, drying the coatings and joining the adhesive-coated surfaces of the substrates, the aqueous contact adhesive composition consisting essentially of
   a) an aqueous emulsion containing a contact adhesive polymer,
   b) 0-50 wt % plasticizer, based on contact adhesive polymer,
   c) 0.5-10 wt % thermoplastic hollow microspheres, based on contact adhesive polymer, and
   d) 0-4.5 wt % polyethylenimine, based on adhesive polymer, the adhesive composition demonstrating less than one pound per linear inch adhesion to stainless steel by PSTC-1 method.

18. A method for laminating two substrates which comprises applying a coating of an aqueous contact adhesive composition to a surface of each of the substrates, drying the coatings and joining the adhesive-coated surfaces of the substrates, the aqueous contact adhesive composition consisting essentially of
   a) an aqueous emulsion containing a contact adhesive polymer which is a vinyl acetate-ethylene, acrylic, styrene-acrylic, styrene-butadiene or neoprene polymer,
   b) 0-50 wt % plasticizer, based on adhesive polymer,
   c) 0.5-10 wt % thermoplastic hollow microspheres, based on adhesive polymer, the microspheres having a dry density of 0.01 to 0.1 g/cm$^3$ and being poly(vinylidene chloride-acrylonitrile), polystyrene or poly(styrene-acrylonitrile) microspheres, and
   d) 0-4.5 wt % polyethylenimine, based on adhesive polymer, having an average molecular weight of about 30,000 to 150,000, the adhesive composition demonstrating less than one pound per linear inch adhesion to stainless steel by PSTC-1 method.

19. The method of claim 18 in which the contact adhesive polymer is a neoprene polymer.

20. The method of claim 18 in which the contact adhesive polymer is an acrylic polymer.

21. The method of claim 18 in which the contact adhesive polymer is a vinyl acetate-ethylene polymer.

22. A method for laminating two substrates which comprises applying a coating of an aqueous contact adhesive composition to a surface of each of the substrates, drying the coatings and joining the adhesive-coated surfaces of the substrates, the aqueous contact adhesive composition consisting essentially of a) an aqueous contact adhesive vinyl acetate-ethylene, copolymer emulsion, the vinyl acetate-ethylene copolymer polymerized in the presence of a stabilizing system consisting essentially of low molecular weight polyvinyl alcohol and a polyalkoxylated nonionic surfactant and the emulsion containing at least 65% solids, b) 15–50 wt % plasticizer, based on contact adhesive copolymer, c) 0.5–4.5 wt % thermoplastic hollow microspheres, based on contact adhesive polymer, the microspheres having a dry density of 0.02 to 0.06 g/cm$^3$ and are poly(vinylidene chloride-acrylonitrile), polystyrene or poly(styrene-acrylonitrile) microspheres, and d) 0.75–4.5 wt % polyethylenimine, based on contact adhesive copolymer, having an average molecular weight of about 30,000 to 150,000, the adhesive composition demonstrating less than one pound per linear inch adhesion to stainless steel by PSTC-1 method.

23. The method of claim 22 in which the microspheres are poly(vinylidene chloride-acrylonitrile) microspheres.

* * * * *